(12) United States Patent
Fortier et al.

(10) Patent No.: US 11,161,600 B2
(45) Date of Patent: Nov. 2, 2021

(54) METHODS OF MOVING AN AIRCRAFT UNDERCARRIAGE BETWEEN A RETRACTED POSITION AND A DEPLOYED POSITION

(71) Applicant: SAFRAN LANDING SYSTEMS, Velizy Villacoublay (FR)

(72) Inventors: Florent Fortier, Velizy Villacoublay (FR); Sébastien Dubois, Velizy Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 440 days.

(21) Appl. No.: 16/191,313

(22) Filed: Nov. 14, 2018

(65) Prior Publication Data
US 2019/0144104 A1 May 16, 2019

(30) Foreign Application Priority Data
Nov. 15, 2017 (FR) ...................................... 1760763

(51) Int. Cl.
*B64C 25/58* (2006.01)
*B64C 25/20* (2006.01)
(Continued)

(52) U.S. Cl.
CPC .............. *B64C 25/58* (2013.01); *B64C 25/14* (2013.01); *B64C 25/20* (2013.01); *B64C 25/24* (2013.01);
(Continued)

(58) Field of Classification Search
CPC ......... B64C 25/58; B64C 25/26; B64C 25/18; B64C 25/20; B64C 25/24
See application file for complete search history.

(56) References Cited

U.S. PATENT DOCUMENTS 2,437,135 A 3/1948 Steinhoff et al.
2012/0080559 A1* 4/2012 Keller ..................... B64C 25/26
244/102 A
(Continued)

FOREIGN PATENT DOCUMENTS

DE 10 2014 003 157 A1 9/2015
EP 0557181 A1 8/1993
(Continued)

OTHER PUBLICATIONS

French Search Report dated Jun. 28, 2018, issued in corresponding French Application No. 1760763, filed Nov. 15, 2017, 2 pages.

*Primary Examiner* — Timothy D Collins
*Assistant Examiner* — Terri L Filosi
(74) *Attorney, Agent, or Firm* — Christensen O'Connor Johnson Kindness PLLC

(57) ABSTRACT

Methods of moving an aircraft undercarriage that is movable between a retracted position and a deployed position generally include: using a rotary electromechanical type drive actuator coupled to a portion of the aircraft undercarriage to raise it from the deployed position to the retracted position; disengaging the drive actuator during a descent of the undercarriage from the retracted position to the deployed position and using a hydraulic linear shock absorber coupled to a portion of the undercarriage to regulate the rate of descent and to absorb shock on arrival of the undercarriage in the deployed position; and neutralizing the shock absorber while raising the undercarriage.

5 Claims, 3 Drawing Sheets

(51) Int. Cl.
*B64C 25/24* (2006.01)
*B64C 25/14* (2006.01)
*B64C 25/26* (2006.01)
*B64C 25/30* (2006.01)
*F16F 9/22* (2006.01)
*F16F 9/34* (2006.01)

(52) U.S. Cl.
CPC .............. *B64C 25/26* (2013.01); *B64C 25/30* (2013.01); *F16F 9/22* (2013.01); *F16F 9/3405* (2013.01); *F16F 2222/12* (2013.01); *F16F 2232/08* (2013.01)

(56) References Cited

U.S. PATENT DOCUMENTS

2015/0279539 A1* 10/2015 Blanding ................ H01F 7/066
  335/228
2016/0273606 A1* 9/2016 Saito .................... F16F 9/3214
2017/0057623 A1* 3/2017 Schmidt .................. B64C 25/20

FOREIGN PATENT DOCUMENTS

FR 2946319 A1 12/2010
FR 2958981 A1 10/2011

* cited by examiner

METHODS OF MOVING AN AIRCRAFT UNDERCARRIAGE BETWEEN A RETRACTED POSITION AND A DEPLOYED POSITION

PRIORITY CLAIM

This application claims priority under 35 U.S.C. § 119 to French Patent Application No. 1760763, filed Nov. 15, 2017, which is herein incorporated by reference in its entirety.

BACKGROUND

Aircraft undercarriages generally mount on an aircraft to move between a retracted position and a deployed position. In general, each undercarriage is associated with a drive actuator for moving the undercarriage from one of these positions to the other. During lowering, the drive actuator is used essentially for controlling the speed of descent, with the undercarriage itself descending towards the deployed position under the action of gravity and of aerodynamic forces. The deployed position is generally defined by a strut of the undercarriage coming into alignment, and it is important to slow down the stroke of the undercarriage as it approaches the deployed position in order to avoid any impact that might be harmful to the integrity of the undercarriage. With a linear hydraulic drive actuator, such slowing down is simple to organize by providing an end-of-stroke damper (dash-pot) in the actuator. Furthermore, the probability of such an actuator becoming blocked is so low that no disengagement clutch system needs to be provided in order to satisfy certification requirements.

In the context of programs for electrifying aircraft, the attention of aircraft manufacturers has been drawn towards using actuators of electromechanical type. By way of example, proposals are made in document FR 2 946 319 to use a drive actuator of rotary electromechanical type coupled to one of the arms of the member for stabilizing the strut in the aligned position, in order both to move the undercarriage, and also to unlock the stabiliser member.

With that type of actuator, it is difficult to regulate the speed of descent of the undercarriage. Specifically, although regulation is provided by the motor of the actuator, it then acts essentially as a brake, and re-injects electricity into the electricity network of the aircraft, which is generally not desired. It is then appropriate to fit the electromechanical actuator with a speed regulator and end-of-stroke shock-absorber member, e.g. a mechanical friction device or even a hydraulic device that is adapted to rotary actuators, as illustrated in Document FR 2 958 981. Nevertheless, those devices make the electromechanical actuator considerably more complex. Also, that type of actuator is not sufficiently reliable to be able to do without a disengagement clutch system in order to enable the undercarriage to be deployed in the event of the actuator blocking. The regulator and shock-absorber member must be capable of operating even when the actuator is de-clutched, and that further adds to the complexity of such a drive actuator.

SUMMARY

The present disclosure generally provides methods of moving an aircraft undercarriage that is movable between a retracted position and a deployed position. In an embodiment, the method includes: using a rotary electromechanical type drive actuator coupled to a portion of the undercarriage in order to raise it from the deployed position to the retracted position; disengaging the drive actuator during a descent of the undercarriage from the retracted position to the deployed position and using a hydraulic linear shock absorber coupled to a portion of the undercarriage in order to regulate the rate of descent and/or in order to absorb shock on arrival of the undercarriage in the deployed position; and neutralizing the shock absorber while raising the undercarriage.

In an embodiment, the method may be applied to an aircraft undercarriage that includes at least one breakable strut having two rods stabilized in an aligned position by a stabilizer member having two links and urged into the aligned position by a spring member of a locking member.

The methods makes it possible to use an electromechanical actuator that is very simple and that is provided with a simple disengagement clutch member. Regulation and damping may be performed by a hydraulic shock absorber that is very simple to design. Speed regulation is obtained very easily merely by means of a calibrated orifice, and can even be varied during the stroke by using an appropriate throttling needle. The end-of-stroke shock absorber is made very easily by means of an end-of-stroke damper. Finally, the shock absorber can be neutralized very easily during raising in purely passive manner by means of a bypass valve. The hydraulic shock absorber is very simple to design, and it performs its function even in the event of the electromechanical actuator becoming blocked. The shock absorber is preferably a member that is independent, i.e. that is not connected to a hydraulic circuit of the aircraft. The methods thus make it possible to use members that are simple, and easy to install.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number.

Figure 1:
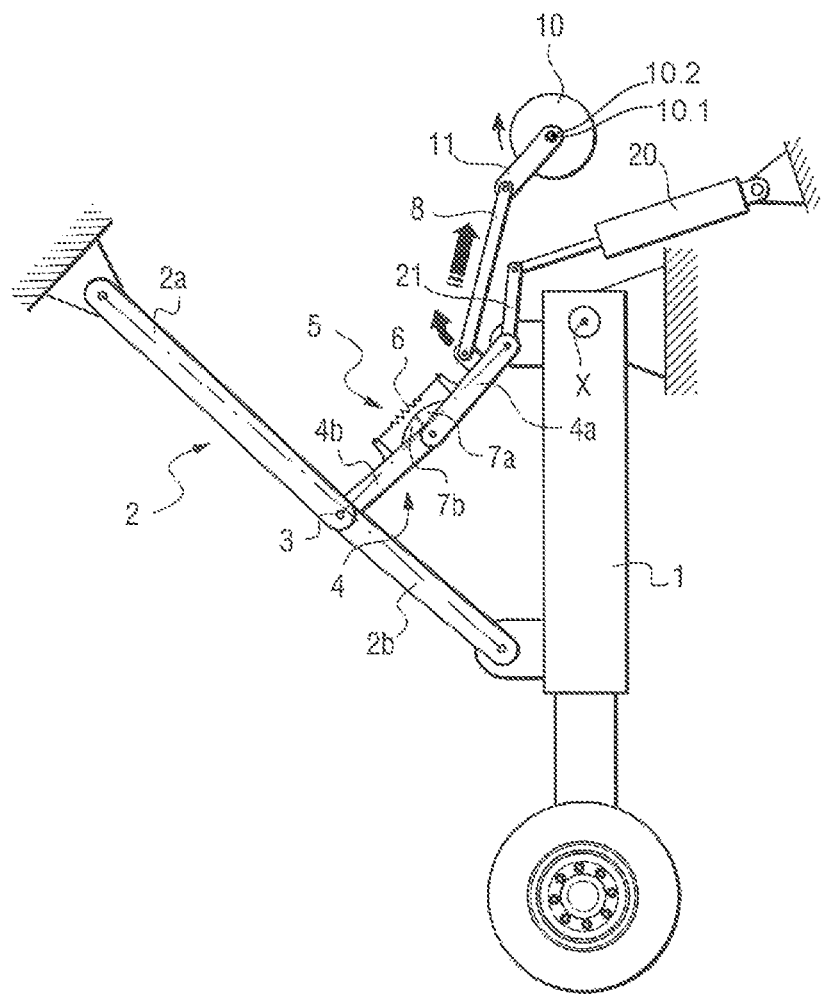
FIG. 1 is a side view of an undercarriage according to the present disclosure, and shown in this figure in the deployed position.

With reference initially to FIG. 1, the undercarriage comprises in conventional manner a leg 1 hinged to the structure of an aircraft about a hinge axis X (seen end-on in the figure) so as to be movable between a deployed position, as shown, into which the undercarriage is put prior to making a landing, and a retracted position, which is the position of the undercarriage in flight.

A breakable strut 2 is hinged firstly to the leg 1 and secondly to the structure of the aircraft. The breakable strut 2 comprises two rods 2a, 2b that are hinged together at a knee 3. The rod 2a is also hinged to the aircraft, while the rod 2b is hinged to the leg 1. The breakable strut 2 is stabilized in a substantially aligned position by means of a stabilizer member 4 comprising two links 4a, 4b, that are also hinged to each other. The link 4a is hinged to the leg 1, and the link 4b is hinged to the strut 2. The links 4a and 4b are held in a substantially aligned position by a locking member 5 having return springs 6 urging the links 4a and 4b towards the locking position as defined by abutments 7a and 7b. When stabilized in this way, the breakable strut 2 opposes any pivoting of the leg 1 about its hinge axis X, such that the deployed position is a stable position. The rods 2a, 2b and the links 4a, 4b are designed in such a manner that in order to reach the locked position as shown, the hinged knee between the rods and the hinged knee between the links both go a little beyond the geometrical alignments represented by chain-dotted lines.

According to the invention, a drive actuator 10 is arranged on the structure of the aircraft to be coupled to the link 4a of the stabilizer member 4, i.e. the link that is hinged to the leg 1 in this example. In this example, the drive actuator 10 is of the rotary electromechanical type and it includes an outlet shaft 10.1 driving the link 4a via a bar 8 that is coupled to a crank 11 secured to the outlet shaft 10.1 of the drive actuator 10. The drive actuator 10 is provided with a disengagement clutch member 10.2 enabling the crank 11 to be free to turn relative to its outlet shaft 10.1, thereby disconnecting the drive actuator 10 from the undercarriage. Still in accordance with the invention, a hydraulic linear shock-absorber 20, distinct from the drive actuator 10, is coupled firstly to the structure of the aircraft and secondly to a crank 21 secured to the link 4a.

The operation of the assembly is explained below with reference to FIGS. 2 to 4. When the undercarriage is to be raised into the retracted position, the drive actuator 10 is engaged. It exerts traction on the link 4a (see arrow), thereby causing it to pivot about its pivot axis relative to the leg, and thereby breaking the alignment between the links 4a and 4b against the action of the return springs 6 of the locking member 5.

Since the link 4b is coupled to the strut 2, the alignment between the rods 2a and 2b is also broken. The undercarriage is thus unlocked and can be pivoted about its hinge axis under drive from the drive actuator 10, as shown in FIG. 3.

As the drive actuator 10 continues to cause the link 4a to pivot, it entrains in succession the other link 4b, the rods 2a and 2b of the strut 2, and finally the leg 1 of the undercarriage. All of these elements are linked together in such a manner that any angular position of the link 4a corresponds to one and only one position of each of these elements. The movement continues until reaching the position shown in FIG. 4, in which the leg 1 has reached its retracted position.

During the movement of the undercarriage from its deployed position to its retracted position, the link 4a moves with movement that is continuous and without any singularity, such that the drive actuator 10 can act on the link 4a to drive the leg with movement that is continuous and always in the same direction. Thus, a single actuator can be used to take the stabilizer member out of alignment, thereby taking the strut out of alignment, and from there moving the leg.

In order to lower the undercarriage into the deployed position, the disengagement clutch member 10.2 of the drive actuator 10 is operated so as to allow the shaft 10.1 of the actuator to turn relative to the crank 11 to which the bar 8 is coupled. Thus, the undercarriage can descend freely under the action of gravity and of aerodynamic forces acting on the undercarriage. Furthermore, the presence of the disengagement clutch member serves to guarantee that the undercarriage descends even in the event of the drive actuator 10 failing, and in particular in the event of it becoming blocked.

Figure 5:
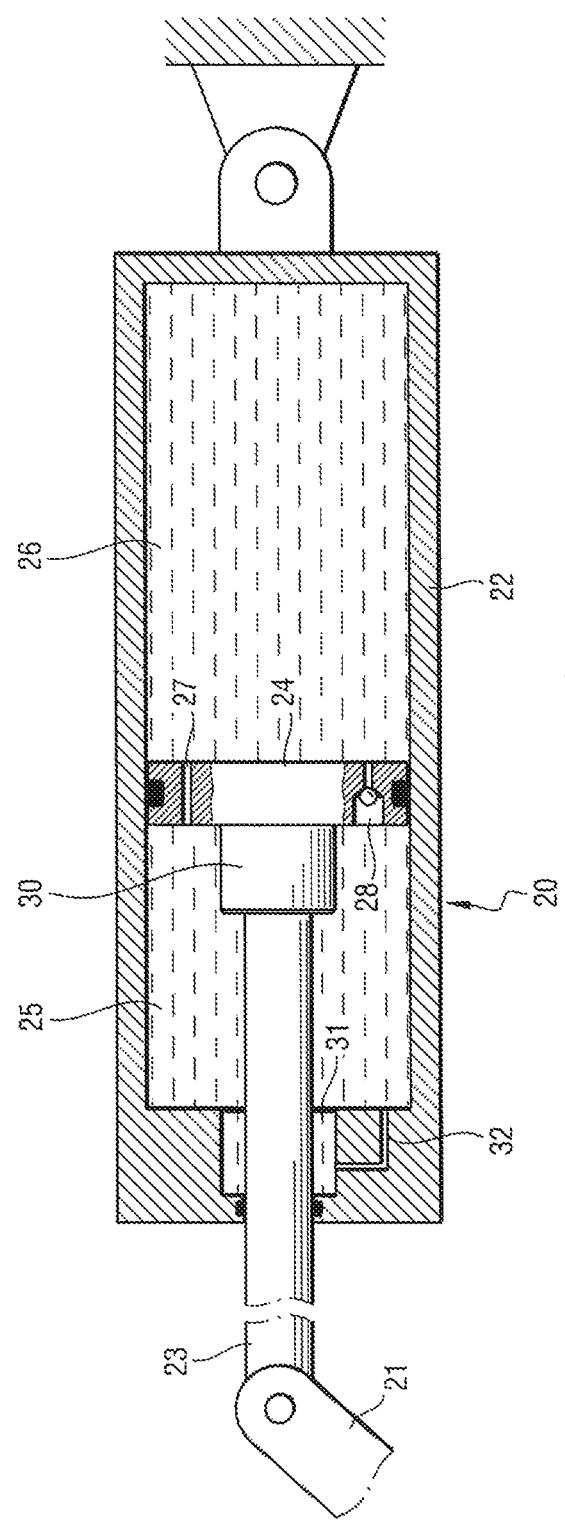
FIG. 5 is a diagrammatic section view of the hydraulic linear shock absorber fitted to the FIG. 1 undercarriage.

The role of the hydraulic linear shock absorber 20 is explained below. As can be seen in FIG. 5, the hydraulic linear shock absorber 20 comprises a body 22 in which a rod 23 terminated by a piston 24 slides in sealed manner, defining two chambers 25 and 26 that are filled with hydraulic fluid. A calibrated orifice 27 extending through the piston 24 enables the fluid to pass from one chamber to the other while the shock absorber 20 is lengthening, and while exerting resistance to the passage of the fluid that is proportional to the square of the rate of lengthening. The piston 24 includes a bypass valve 28 that allows the fluid to pass from one chamber to the other without resistance during shortening of the shock absorber 20. Finally, the piston 24 presents a swelling 30 at its base that penetrates as a close fit into a cylindrical cavity 31 in the end of the body 22, thereby holding captive fluid that can escape only via a channel 32 of calibrated diameter for returning the fluid to one of the chambers of the shock absorber (which device is referred to as a dashpot). An accumulator device (not shown) absorbs or delivers any differences of fluid volume between the two chambers as occur during movements of the undercarriage.

Figure 4:
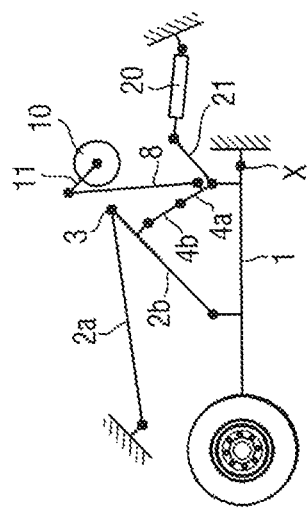
FIG. 4 is a centerline side view of the undercarriage of FIG. 1, showing it in a retracted position.
Figure 3:
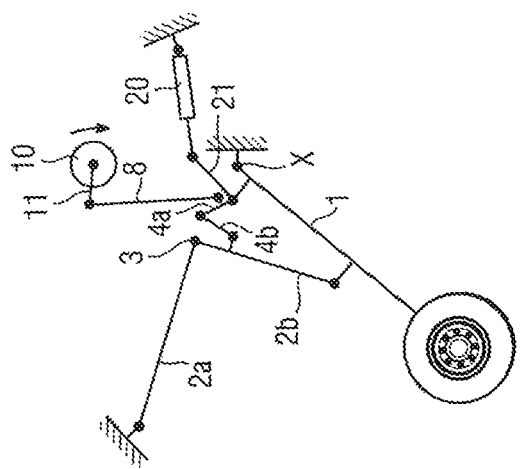
FIG. 3 is a centerline side view of the undercarriage of FIG. 1, showing it in an intermediate position.
Figure 2:
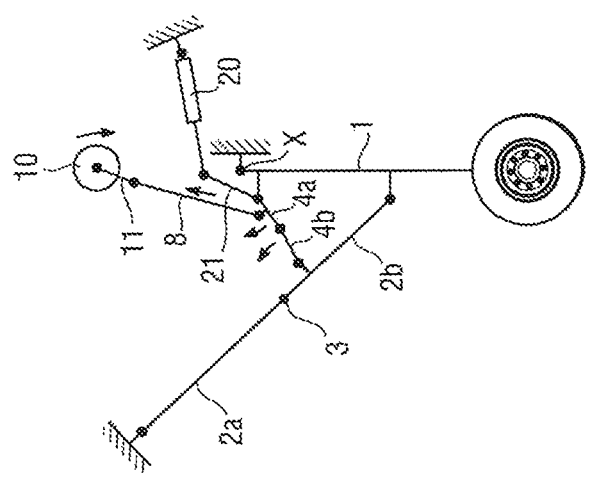
FIG. 2 is a centerline side view of the undercarriage of FIG. 1, showing it in a deployed position.

Thus, while raising the undercarriage, as shown in FIGS. 2 to 4, the hydraulic linear shock absorber 20 shortens but does not experience any resistance, since the bypass 28 allows hydraulic fluid to pass freely from one chamber to the other, thereby taking the hydraulic linear shock absorber out of action during raising in a manner that is entirely passive.

In contrast, while lowering the undercarriage under the sole effect of gravity and aerodynamic forces, the hydraulic linear shock absorber 20 lengthens and the internal fluid is forced to pass from one chamber to the other through the calibrated orifice 27, thereby throttling the fluid, and thus delivering an opposing force that is proportional to the square of the rate of lengthening of the shock absorber, thereby regulating the rate of descent of the undercarriage. At the end of the stroke, immediately before the links 4a and 4b reach the locking position defined by the abutments 7a and 7b, the swelling 30 penetrates as a close fit into the cavity 31, forcing the fluid that is held captive in this way to escape via the calibrated orifice 32, thereby slowing down the undercarriage strongly so as to avoid any sudden impact when the undercarriage reaches the deployed position.

The hydraulic linear shock absorber 20 operates during every descent of the undercarriage, regardless of whether that is under voluntary control by the pilot prior to landing, or else is a result of the drive actuator 10 becoming blocked while raising the undercarriage, thereby causing the pilot to engage an emergency lowering of the undercarriage during which the drive actuator 10 is disengaged relative to the undercarriage by appropriately controlling its disengagement clutch member.

While illustrative embodiments are illustrated and described herein, it will be appreciated that various changes can be made without departing from the spirit and scope of the present disclosure. The present disclosure is not limited to the above description, but on the contrary covers any variant coming within the ambit defined by the claims.

In particular, although in the example shown, the drive actuator 10 is coupled to one of the links of the stabilizer member, thereby enabling it to be unlocked at the same time as raising the undercarriage, the drive actuator could be arranged differently, e.g. directly on the pivot of the link 4a, or indeed by coupling it to the leg of the undercarriage or to one of the rods of the strut. An unlocking actuator could then be provided to take the links of the stabilizer member out of alignment when raising the undercarriage.

In an embodiment, the hydraulic linear shock absorber is arranged so as to act on one of the links of the locking member in order to absorb shock on arrival of the links in the locking position and thereby absorb shock on arrival of the strut in the aligned position. Nevertheless, it could be arranged otherwise, e.g. by being coupled between the strut and the stabilizer member, or by being coupled between the structure of the aircraft and the leg of the undercarriage. Also, it could be arranged in such a manner as to shorten during a lowering of the undercarriage and to lengthen during the raising of the undercarriage. In an embodiment, it is possible to cause the opposing force to vary with variation in the stroke of the shock absorber, e.g. by means of a throttling needle.

Finally, the provisions of the present disclosure apply particularly to an undercarriage having at least one breakable strut and an alignment stabilizer member. However, the present disclosure may be applied to other types of undercarriage, in particular to undercarriages having a breakable strut with internal locking, or indeed to undercarriages having a telescopic strut.

The embodiments of the invention in which an exclusive property or privilege is claimed are defined as follows:

1. A method of moving an aircraft undercarriage that is movable between a retracted position and a deployed position, the method comprising:
    using a rotary electromechanical type drive actuator coupled to a portion of the undercarriage in order to raise it from the deployed position to the retracted position;
    disengaging the drive actuator during a descent of the undercarriage from the retracted position to the deployed position and using a hydraulic linear shock absorber coupled to a portion of the undercarriage in order to regulate a rate of descent and to absorb shock on arrival of the undercarriage in the deployed position; and
    neutralizing the shock absorber while raising the undercarriage.

2. The method of claim 1, wherein disengaging the drive actuator comprises disengaging the drive actuator with a clutch member forming part of the drive actuator that enables an outlet shaft of the drive actuator to be disengaged from an element driven by the outlet shaft in order to move the undercarriage.

3. The method of claim 1, wherein neutralizing the shock absorber comprises neutralizing the shock absorber in a passive manner by a bypass installed between two chambers of the shock absorber.

4. A method of moving an aircraft undercarriage that is movable between a retracted position and a deployed position, the aircraft undercarriage comprising at least one breakable strut having two rods stabilized in an aligned position by a stabilizer member having two links and urged into the aligned position by a spring member of a locking member, the method comprising:
    using a rotary electromechanical type drive actuator coupled to a portion of the undercarriage in order to raise it from the deployed position to the retracted position;
    disengaging the drive actuator during a descent of the undercarriage from the retracted position to the deployed position and using a hydraulic linear shock absorber coupled to a portion of the undercarriage in order to regulate the rate of descent and to absorb shock on arrival of the undercarriage in the deployed position; and
    neutralizing the shock absorber while raising the undercarriage,
    wherein the drive actuator is coupled to one of the links of the locking member.

5. The method of claim 4, wherein the hydraulic linear shock absorber is coupled to one of the links of the stabilizer member.

* * * * *